US010625843B2

(12) United States Patent
Benson et al.

(10) Patent No.: US 10,625,843 B2
(45) Date of Patent: Apr. 21, 2020

(54) ENERGY DISPERSION PLUG FOR UAV

(71) Applicant: Wing Aviation LLC, Mountain View, CA (US)

(72) Inventors: Stephen Benson, San Carlos, CA (US); Adam Woodworth, San Jose, CA (US); Michael Nowakowski, Santa Clara, CA (US); James Schmalzried, San Jose, CA (US); Adem Rudin, Mountain View, CA (US)

(73) Assignee: Wing Aviation LLC, Mountain View, CA (US)

( * ) Notice: Subject to any disclaimer, the term of this patent is extended or adjusted under 35 U.S.C. 154(b) by 307 days.

(21) Appl. No.: 15/815,428

(22) Filed: Nov. 16, 2017

(65) Prior Publication Data

US 2019/0144097 A1    May 16, 2019

(51) Int. Cl.
*B64C 1/06* (2006.01)
*B64C 39/02* (2006.01)
*B64C 29/00* (2006.01)
*B64C 27/26* (2006.01)

(52) U.S. Cl.
CPC .............. *B64C 1/062* (2013.01); *B64C 1/065* (2013.01); *B64C 39/024* (2013.01); *B64C 27/26* (2013.01); *B64C 29/0025* (2013.01); *B64C 2201/104* (2013.01); *B64C 2201/108* (2013.01); *B64C 2201/165* (2013.01)

(58) Field of Classification Search
CPC ....... B64C 1/062; B64C 1/065; B64C 39/024; B64C 27/26
See application file for complete search history.

(56) References Cited

U.S. PATENT DOCUMENTS

| 6,425,794 | B1 * | 7/2002 | Levy | A63H 27/02 |
| | | | | 446/34 |
| 7,237,750 | B2 * | 7/2007 | Chiu | A45C 13/02 |
| | | | | 244/119 |

FOREIGN PATENT DOCUMENTS

JP    2012245832 A    12/2012

OTHER PUBLICATIONS https://web.archive.org/web/20140101031814/http://catalog.swaco.com/viewitems/pop-tools/pop-174-mushroom-plugs (Jan. 2014).*

* cited by examiner

*Primary Examiner* — Justin M Benedik
(74) *Attorney, Agent, or Firm* — Christensen O'Connor Johnson Kindness PLLC

(57) ABSTRACT

An energy dispersion plug for use in an unmanned aerial vehicle (UAV) includes a blunt head section, a wedge section, and a rim section. The blunt head section has an outer side for receiving an impact force and an inner side opposite the outer side. The wedge section has a base end and a distal end opposite the base end. The wedge section extends at the base end from the inner side of the blunt head section towards the distal end and the distal end has a smaller cross-sectional area than the base end. The wedge section is shaped and sized to fit into an open end of a hollow structural member of the UAV and to transfer impact energy incident upon the blunt head section into the hollow structural member to shatter the hollow structural member into fragments.

21 Claims, 7 Drawing Sheets

ENERGY DISPERSION PLUG FOR UAV

TECHNICAL FIELD

This disclosure relates generally to the field of unmanned aerial vehicles.

BACKGROUND INFORMATION

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Unmanned aerial vehicles (UAVs) are becoming more popular in general. Their use over populated areas, such as suburban and urban localities, means that designed in safety measures and components are increasingly important.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1A:
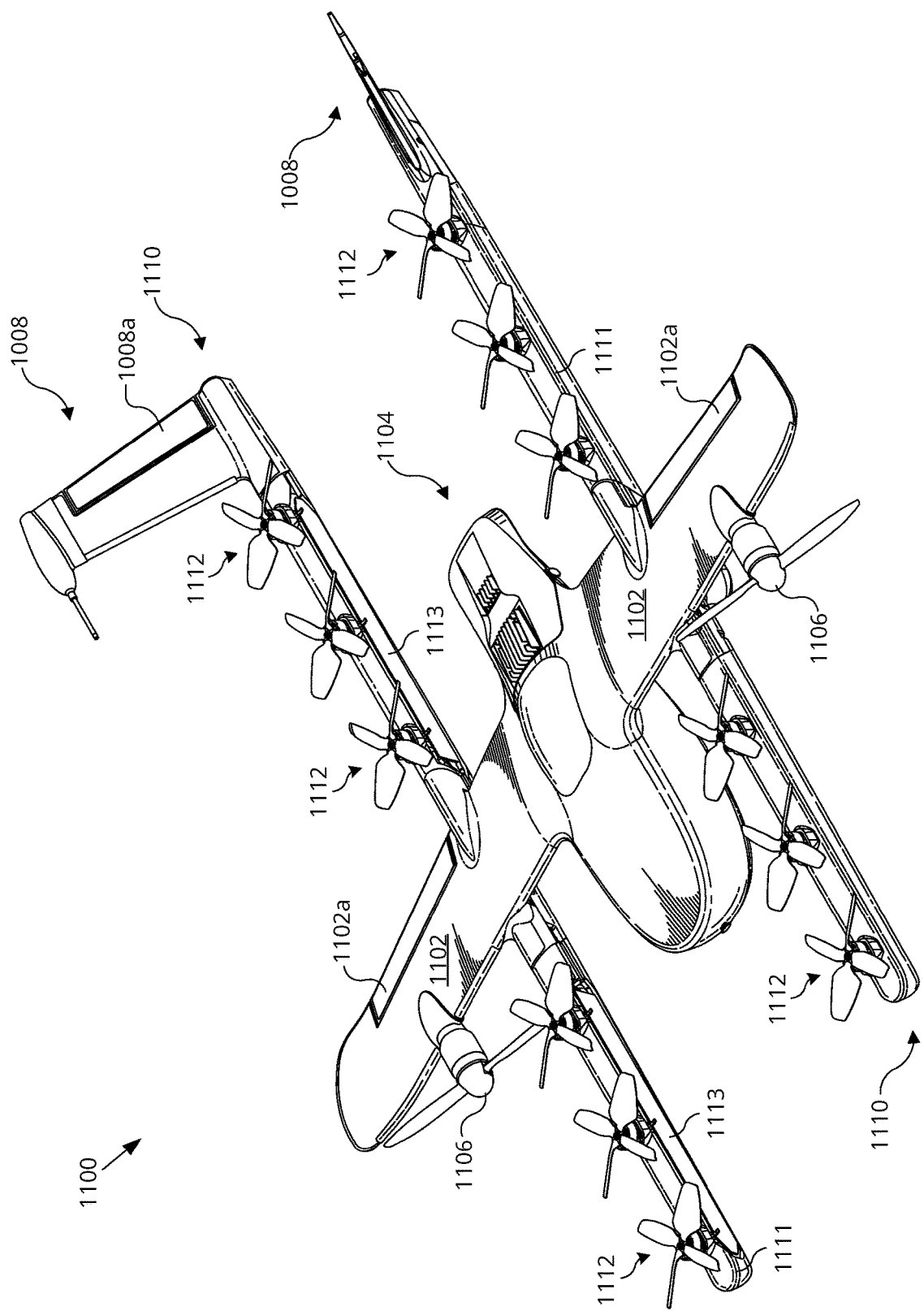
FIG. 1A is a perspective view illustration of an unmanned aerial vehicle (UAV), in accordance with an embodiment of the disclosure.

Embodiments of a system and apparatus for an unmanned aerial vehicle (UAV) having one or more energy dispersion plugs are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments described herein include an unmanned aerial vehicle (UAV), which refers to any autonomous or semi-autonomous vehicle that is capable of performing some functions without a physically present human pilot. A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

UAVs can have structural elements that operate as a skeleton or frame, to which other elements are mounted, for carrying load forces during operation. Examples of such structural elements include wing spars, boom carriers, and the like. These elements should be strong while also light weight. To achieve a balance between strength and weight, these structural elements are often hollow (e.g., tubular) members fabricated of materials such as metal (e.g., aluminum), fiberglass, carbon fiber (e.g., filament wound carbon fiber tubes), or otherwise. These hollow structural members can pierce objects should their open ends strike at certain angles with sufficient impact force in the event of catastrophic failure (e.g., crash landing).

Accordingly, embodiments described herein contemplate the insertion of energy dispersion plugs into the open ends of hollow structural members throughout a UAV to improve safety and reduce property damage in the event of crash landings of a UAV. The energy dispersion plugs include blunt head sections for absorbing impact forces and a wedge section that directs/focuses the impact forces into shattering the hollow structural member. In other words, the energy dispersion plugs are designed to cause the hollow structural members to explode or shatter due to impact so that the energy of the impact is distributed into destruction of the hollow structural member and away from driving the hollow structural member into the crash site. In some embodiments, the energy dispersion plugs further include a rim that defines a recess for catching or blocking shards/fragments of a fractured hollow structural member from driving forward in the direction of impact.

Figure 1B:
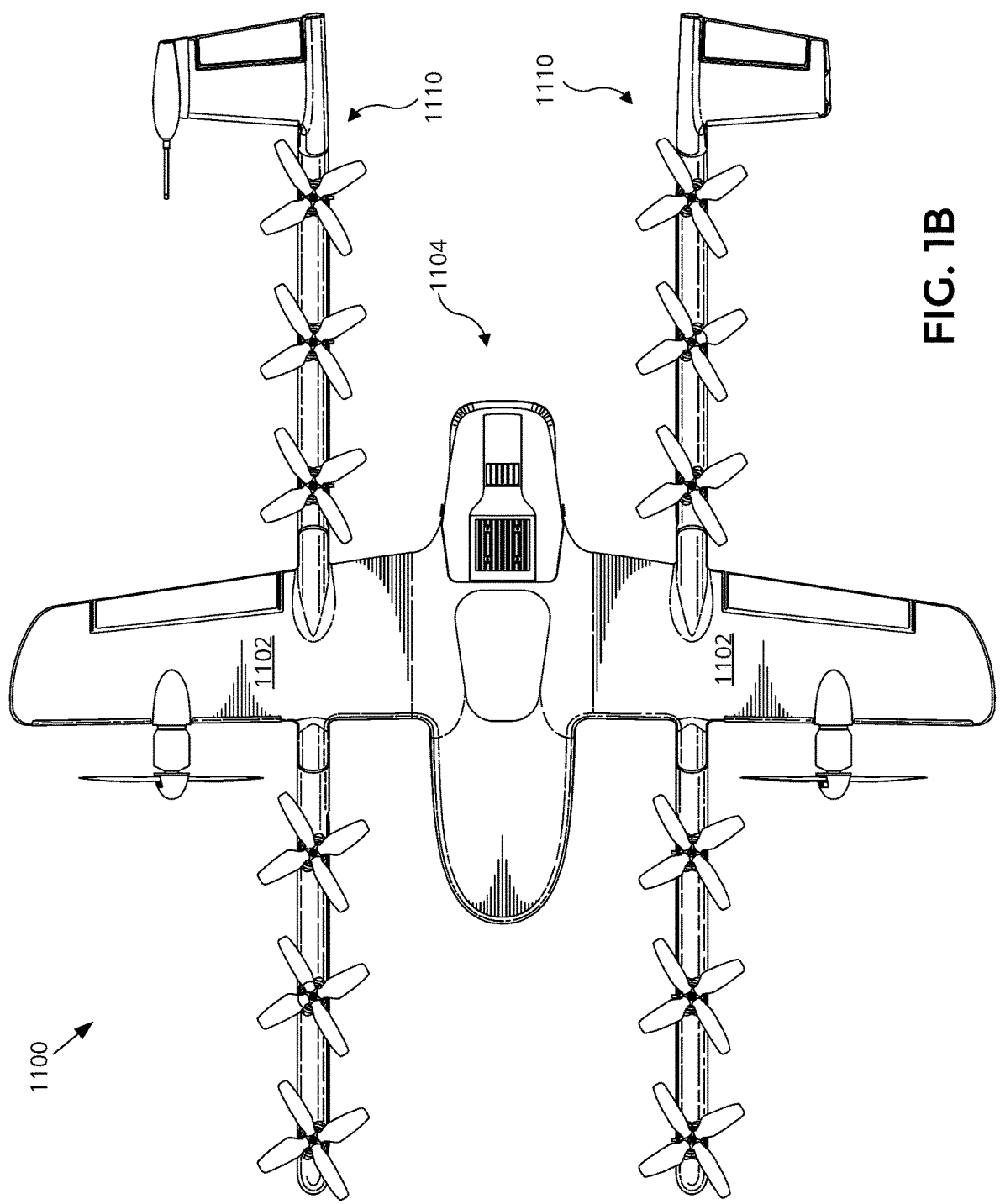
FIG. 1B is a top plan view illustration of the UAV, in accordance with an embodiment of the disclosure.
Figure 1C:
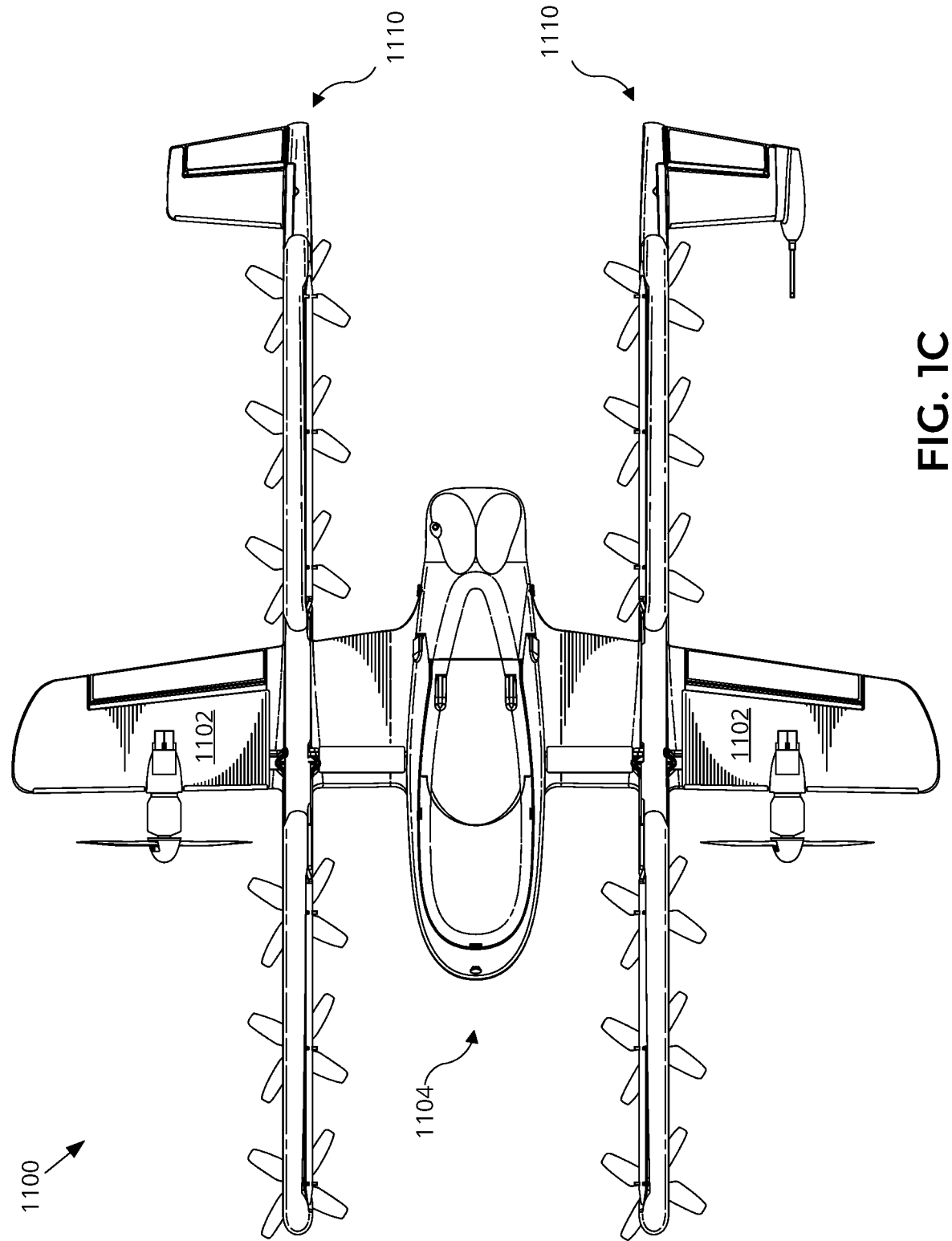
FIG. 1C is a bottom plan view illustration of the UAV, in accordance with an embodiment of the disclosure.

FIG. 1A is a perspective view illustration of a UAV 1100, according to an embodiment of the disclosure. FIG. 1B is a top plan view of UAV 1100 while FIG. 1C is a bottom plan view of the same. FIGS. 1A-C illustrate an example of a fixed-wing UAV 1100, which also may be referred to as an airplane, an aeroplane, a glider, or a plane, among other possibilities. The fixed-wing UAV 1100, as the name implies, has a wing assembly 1102 that can generate lift based on the wing shape and the vehicle's forward airspeed. For instance, wing assembly 1102 may have an airfoil-shaped cross section to produce an aerodynamic lift force on the UAV 1100. It should be appreciated that the energy dispersion plugs described herein may be used with other types of UAVs than the one depicted.

The illustrated embodiment of UAV 1100 includes a fuselage 1104. In one embodiment, fuselage 1104 is modular and includes a battery module, an avionics module, a mission payload module, and a fuselage cover. These modules are detachable from each other and mechanically securable to each other to contiguously form at least a portion of the fuselage or UAV main body.

The battery module may house one or more batteries for powering UAV 1100. The avionics module houses flight control circuitry of UAV 1100, which may include a processor and memory, communication electronics and antennas (e.g., cellular transceiver, wifi transceiver, etc.), and various sensors (e.g., global positioning sensor, an inertial measurement unit (IMU), a magnetic compass, etc.). The mission payload module houses equipment associated with a mission of UAV 1100. For example, the mission payload module may include a payload actuator for holding and releasing an externally attached payload. In another embodiment, the mission payload module may include a camera/sensor equipment holder for carrying camera/sensor equipment (e.g., camera, lenses, radar, lidar, pollution monitoring sensors, weather monitoring sensors, etc.). In yet another embodiment, the mission payload module may include an additional battery holder to house additional or larger batteries for extended flight times. Of course, the mission payload module may provide mixed use payload capacity (e.g., additional battery and camera equipment) for a variety of mix-use missions.

Figure 5A:
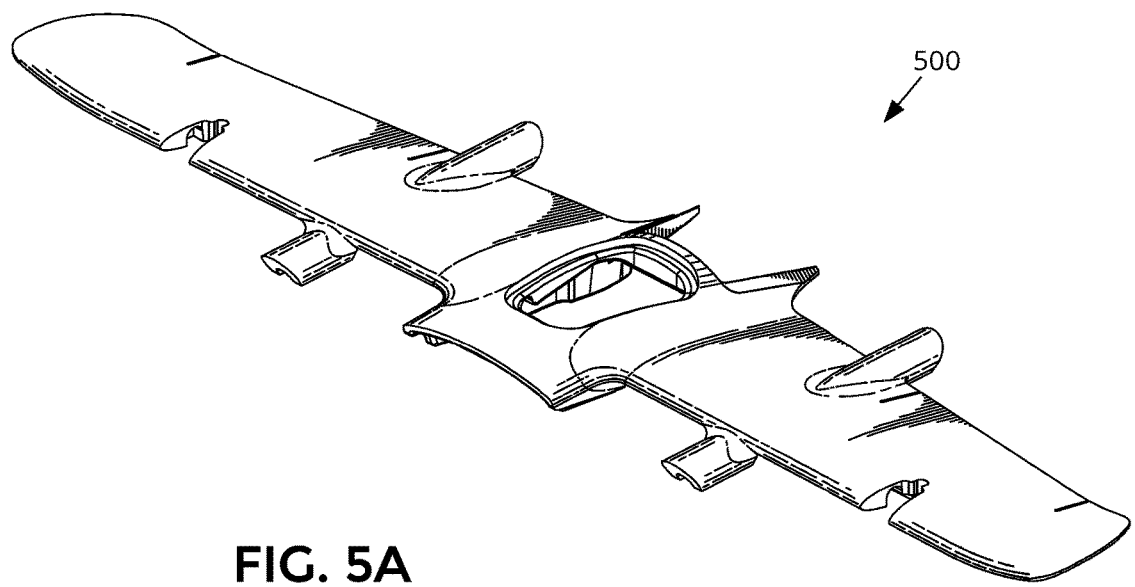
FIG. 5A is a perspective view illustration of a wing assembly for a UAV including an internal wing spar having energy dispersion plugs disposed in open ends, in accordance with an embodiment of the disclosure.
Figure 5B:
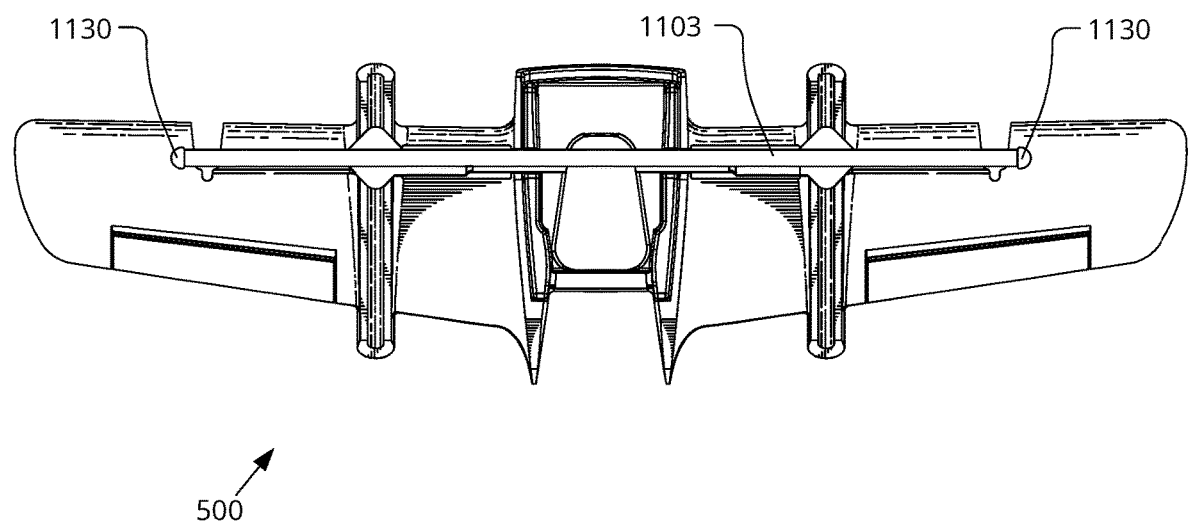
FIG. 5B is a bottom side view illustration of the wing assembly including the internal wing spar having energy dispersion plugs disposed in open ends, in accordance with an embodiment of the disclosure.

The illustrated embodiment of UAV 1100 further includes forward propulsion units 1106 positioned on wing assembly 1102, which can each include a motor, shaft, and propeller, for propelling UAV 1100. The illustrated embodiment of UAV 1100 further includes two boom assemblies 1110 that secure to wing assembly 1102. In one embodiment, wing assembly 1102 includes a wing spar 1103 (e.g., see FIGS. 1D and 5B) disposed within a wing foil 500 (FIGS. 5A and 5B). Wing spar 1103 may be a hollow structural member (e.g., tubular rod) extending along the internal length of the wing foil and provides a main structural member that connects wing assembly 1102 to fuselage 1104 and to which boom assemblies 1110 mount.

The illustrated embodiments of boom assemblies 1110 each include a boom housing 1111 in which a boom carrier 1114 (see FIG. 1D) is disposed, vertical propulsion units 1112, printed circuit boards 1113, and stabilizers 1108. In the illustrated embodiment, boom carriers 1114 are also hollow structural members (e.g., tubular rods) that provide the main structural support to which wing spar 1103 and vertical propulsion units 1112 are mounted. Vertical propulsion units 1112 can each include a motor, shaft, and propeller, for providing vertical propulsion. Vertical propulsion units 1112 may be used during a hover mode where UAV 1100 is descending (e.g., to a delivery location) or ascending (e.g., following a delivery). Stabilizers 1108 (or fins) may be included with UAV 1100 to stabilize the UAV's yaw (left or right turns) during flight. In some embodiments, UAV 1100 may be configured to function as a glider. To do so, UAV 1100 may power off its propulsion units and glide for a period of time.

During flight, UAV 1100 may control the direction and/or speed of its movement by controlling its pitch, roll, yaw, and/or altitude. For example, the stabilizers 1108 may include one or more rudders 1108a for controlling the UAV's yaw, and wing assembly 1102 may include elevators for controlling the UAV's pitch and/or ailerons 1102a for controlling the UAV's roll. As another example, increasing or decreasing the speed of all the propellers simultaneously can result in UAV 1100 increasing or decreasing its altitude, respectively.

Many variations on the illustrated fixed-wing UAV are possible. For instance, fixed-wing UAVs may include more or fewer propellers, and/or may utilize a ducted fan or multiple ducted fans for propulsion. Further, UAVs with more wings (e.g., an "x-wing" configuration with four wings), are also possible. Although FIGS. 1A-1C illustrate one wing assembly 1102, two boom assemblies 1110, two forward propulsion units 1106, and six vertical propulsion units 1112 per boom assembly 1110, it should be appreciated that other variants of UAV 1100 may be implemented with more or less of these components. For example, UAV 1100 may include two wing assemblies 1102, four boom assemblies 1110, and more or less propulsion units (forward or vertical).

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

Figure 1D:
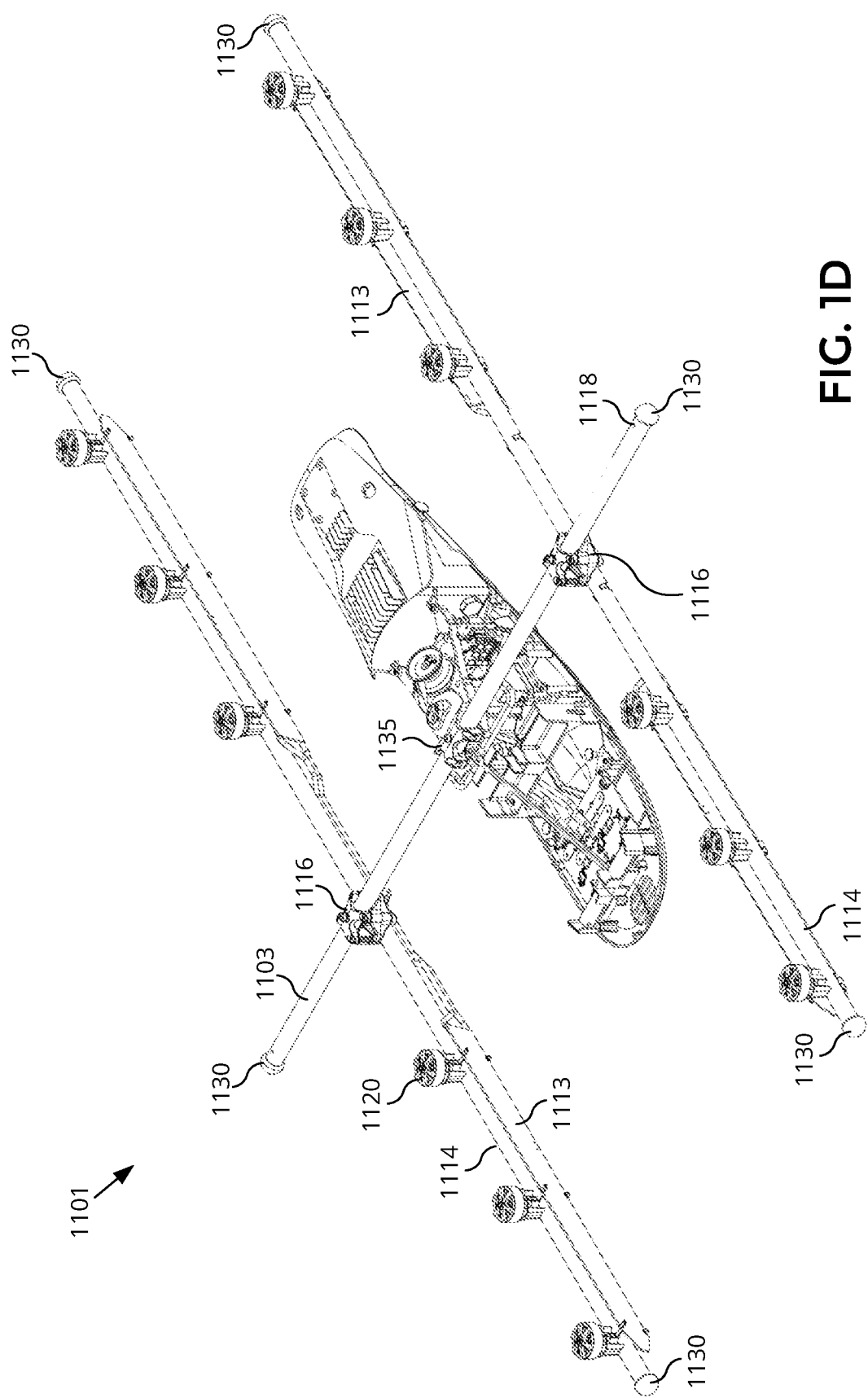
FIG. 1D is a perspective view illustration of a frame of the UAV, in accordance with an embodiment of the disclosure.

FIG. 1D is a perspective view illustration of a structural frame 1101 (also referred to as a "structural H-frame" or an "H-frame") of UAV 1100, in accordance with an embodiment of the disclosure. H-frame 1101 includes wing spar 1103 and boom carriers 1114. In some embodiments wing spar 1103 and boom carriers 1114 may be made of carbon fiber, hard plastic, aluminum, light metal alloys, or otherwise. Wing spar 1103 and boom carriers 1114 may be connected with clamps 1116. Wing spar 1103 may include pre-drilled holes 1118 for mounting horizontal propulsion units, and boom carriers 1114 may include pre-drilled holes (hidden by motor mounts 1120) for mounting vertical propulsion units. In the illustrated embodiment, fuselage 1104 is removeably attached to the H-frame (e.g., attached to the wing spar 1103 by clamp 1135).

As illustrated in FIG. 1D energy dispersion plugs 1130 are inserted into the open ends of the hollow structural members (e.g., wing spar 1103 and/or boom carriers 1114) that make up structural frame 1101 of UAV 1100. Although FIG. 1D illustrates all ends of both wing spar 1103 and boom carriers 1114 as being plugged by an energy dispersion plug 1130, it should be appreciated that less than all ends may be plugged. In some embodiments, only boom carriers 1114 (or even just the front ends of boom carriers 1114) are plugged with energy dispersion plugs 1130.

As mentioned above, energy dispersion plugs 1130 improve safety and reduce property damage in the event of crash landings of UAV 1100. Energy dispersion plugs 1130 are designed to cause boom carriers 1114 and/or wing spar 1103 to explode or shatter on impact so that the energy of the impact is distributed into destruction of the hollow structural member and away from driving the hollow structural member into the crash site.

Figure 2A:
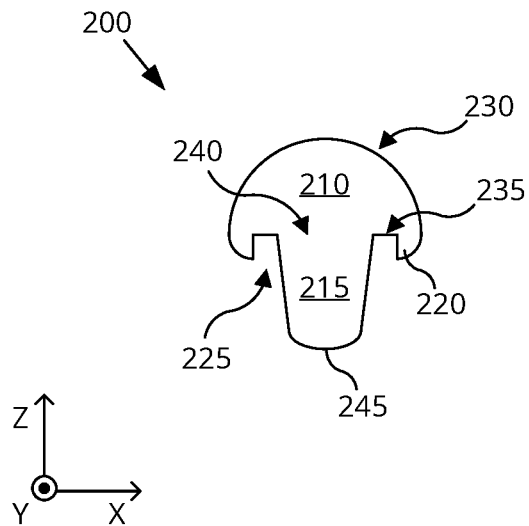
FIG. 2A is a cross-sectional illustration of an energy dispersion plug for the UAV, in accordance with an embodiment of the disclosure.
Figure 2B:
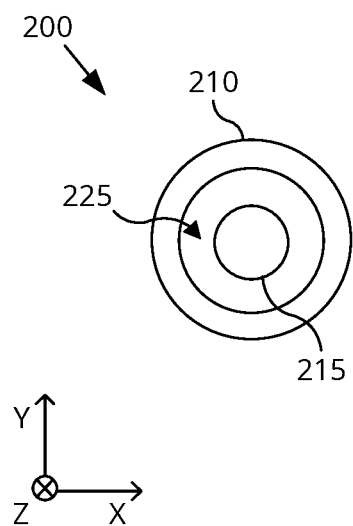
FIG. 2B is a bottom plan view illustration of the energy dispersion plug, in accordance with an embodiment of the disclosure.
Figure 2C:
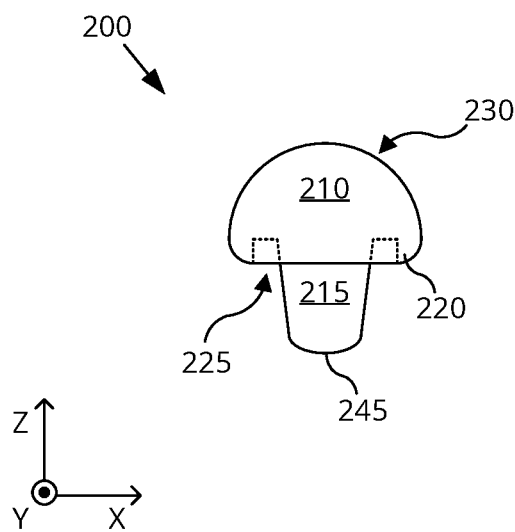
FIG. 2C is a side view illustration of the energy dispersion plug, in accordance with an embodiment of the disclosure.
Figure 2D:
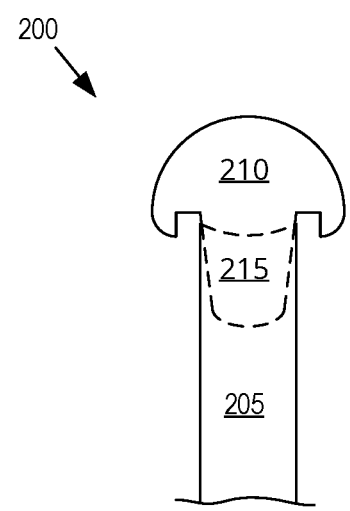
FIG. 2D illustrates the energy dispersion plug inserted within an open end of a hollow structural member of a UAV, in accordance with an embodiment of the disclosure.

FIGS. 2A-D illustrate an energy dispersion plug 200 for plugging hollow structural members of a UAV, in accordance with an embodiment of the disclosure. Energy dispersion plug 200 is one possible implementation of energy dispersion plugs 1130 illustrated in FIG. 1D. FIG. 2A is a cross-sectional illustration of energy dispersion plug 200, FIG. 2B is a bottom plan view illustration, FIG. 2C is a side view illustration, and FIG. 2D is a cross-sectional illustration of energy dispersion plug 200 inserted into the open end of a hollow structural member 205. The illustrated embodiment of energy dispersion plug 200 includes a blunt head section 210, a wedge section 215, a rim 220, and a recess 225. The illustrated embodiment of blunt head section 210 includes an outer side 230 and an inner side 235. The illustrated embodiment of wedge section 215 has a base end 240 proximate to inner side 235 and a distal end 245.

Wedge section 215 extends at its base end 240 from inner side 235 of blunt end section 210 towards distal end 245, which is opposite base end 240. Rim 220 is disposed around a perimeter of inner side 235 and defines or forms recess 225 around base end 240 of wedge section 215. As illustrated in FIG. 2D, wedge section 215 is shaped and sized to fit into an open end of hollow structural member 205, which may represent wing spar 1103 or boom carrier 1114 of UAV 1100.

In the illustrated embodiment, distal end 245 of wedge section 215 has a smaller cross-sectional area than base end 240 of wedge section 215. This shape forms a slanted or "wedge" shape that transfers impact energy incident upon outer side 230 of blunt head section 210 into hollow structural member 205 to shatter hollow structural member 205 into shards or fragments. As illustrated, wedge section 215 fits snuggly into the open end of hollow structural member 205; however, base end 240 has a larger outside diameter than the inside diameter of hollow structural member 205. When wedge section 215 is pushed further into hollow structural member 205 due to an impact force on outer side 230, the mechanical advantage provided by the sloped or "wedge" shape fractures hollow structural member 205 thereby distributing the impact energy into the destruction of hollow structural member 205.

When hollow structural member 205 is fractured or destroyed by an impact on the blunt head section of an energy dispersion plug, hollow structural member 205 may fracture into shards or small pieces. Rim 220 defines recess 225 around the perimeter of wedge section 215. Recess 225 operates as a catch to these potential shards and blocks their forward movement along the direction of impact to further protect the impact site. In events where an impact on blunt head section 210 is not sufficient to fracture or destroy hollow structural member 205, energy dispersion plug 200 still serves to provide a larger, blunt impact surface than the open end of hollow structural member 205 to thereby protect the impact site.

In one embodiment, the cross-sectional shape of wedge section 215 matches or conforms to the cross-sectional shape of hollow structural member 205. For example, the cross-sectional shape may be oval, circular (as illustrated), square, hexagonal, octagonal, or otherwise. In other embodiments, wedge section 215 has a different cross-sectional shape than hollow structural member 205. For example, wedge section 215 may have a square cross-sectional shape while hollow structural member 205 is circular. In this embodiment, the corners of the square cross-sectional shape of wedge section 215 operate as pressure focusing elements to further focus impact energy for shattering hollow structural member 205.

In the illustrated embodiment, energy dispersion plug 200 has an overall mushroom-like profile shape with a convex shape for outer side 230 of blunt head section 210. In one embodiment, distal end 245 is also a blunt or rounded surface for added safety in assembly and/or during impact.

Energy dispersion plug 200 may be formed of a variety of materials. Energy dispersion plug 200 may be formed of a single, continuous material (e.g., glass filled nylon, hard plastic, etc.) or multiple materials. For example, blunt head section 210 may be fabricated of a softer material, or have a softer outer coating layer over outer side 230 for cushioning impact while wedge section 215 is fabricated of a harder material for fracturing hollow structural member 205.

Figure 3A:
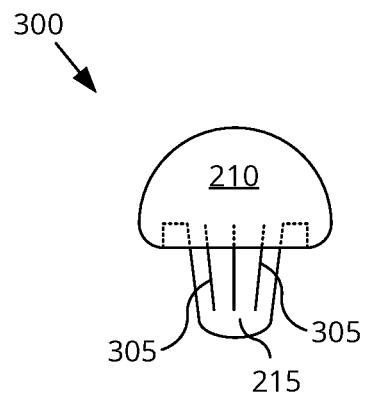
FIG. 3A is a side view illustration of an energy dispersion plug including pressure focusing elements, in accordance with an embodiment of the disclosure.
Figure 3B:
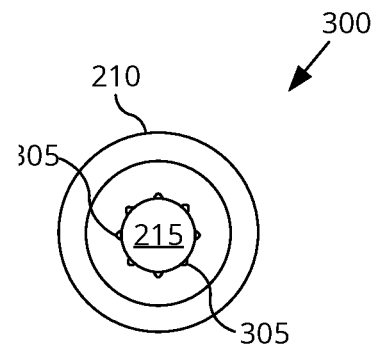
FIG. 3B is a bottom plan view illustration of the energy dispersion plug including pressure focusing elements, in accordance with an embodiment of the disclosure.
Figure 3C:
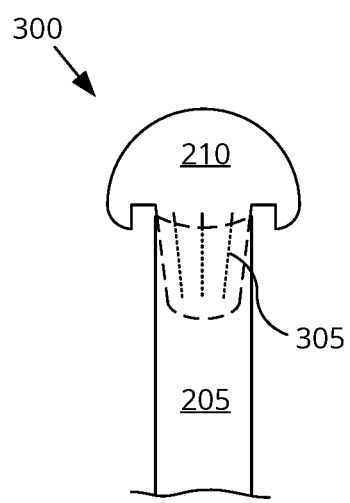
FIG. 3C illustrates the energy dispersion plug with pressure focusing elements inserted within an open end of a hollow structural member of a UAV, in accordance with an embodiment of the disclosure.

FIGS. 3A-C illustrate an energy dispersion plug 300 including pressure focusing elements for fracturing hollow structural members of a UAV, in accordance with an embodiment of the disclosure. Energy dispersion plug 300 is yet another possible implementation of energy dispersion plugs 1130 illustrated in FIG. 1D and is similar to energy dispersion plug 200 except for the addition of pressure focusing elements 305 along sides of wedge section 215. FIG. 3A is a side view illustration of energy dispersion plug 300, FIG. 3B is a bottom plan view illustration, and FIG. 3C is a cross-sectional illustration of energy dispersion plug 300 inserted into the open end of hollow structural member 205.

Pressure focusing elements 305 are disposed along the sides of wedge section 215 to focus the impact energy for shattering hollow structural member 205. Pressure focusing elements 305 create focal points for the impact energy. Pressure focusing elements 305 may be implemented as ribs, bumps, corners of a cross-sectional shape, inserts (e.g., carbide inserts), or otherwise. In one embodiment, pressure focusing elements 305 are fabricated of a harder material than wedge section 215. In one embodiment, wedge section 215 may have a rectangular cross-sectional shape and the corners operate as pressure focusing elements 305 when inserted into a oval or circular hollow structural member.

Figure 4:
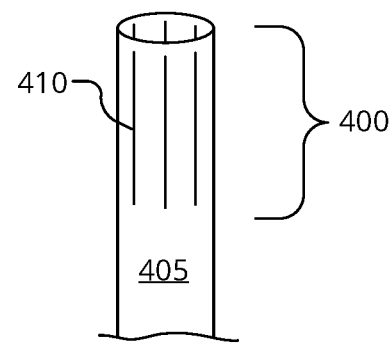
FIG. 4 illustrates a structurally weakened end of a hollow structural member of a UAV, in accordance with an embodiment of the disclosure.

FIG. 4 illustrates a structurally weakened end 400 of a hollow structural member 405 of a UAV, in accordance with an embodiment of the disclosure. Hollow structural member 405 may be used to implement wing spar 1130 or boom carriers 1114 illustrated in FIG. 1D. Structurally weakened end 400 of hollow structural member 405 is structurally weakened relative to a middle section of hollow structural member 405 to encourage or facilitate destruction of hollow structural member 405 when an energy dispersion plug is driven into the open end upon impact. End 400 may be structurally weakened via a variety of techniques. In one embodiment, grooves or slits 410 may be cut, engraved, or etched into end 400. In other embodiments, end 400 may be structurally compromised with heat treatments, introducing material defects, strategic thinning in specific regions, or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus for use in an unmanned aerial vehicle (UAV), the apparatus comprising:
    an energy dispersion plug including:
        a blunt head section having an outer side for receiving an impact force and an inner side opposite the outer side;
        a wedge section having a base end and a distal end opposite the base end, wherein the wedge section extends at the base end from the inner side of the blunt head section towards the distal end, wherein the outer side of the blunt head section is softer than the wedge section; and
        a rim disposed around a perimeter of the inner side of the blunt head section forming a recess around the base end of the wedge section,
    wherein the wedge section is shaped and sized to fit into an open end of a hollow structural member of the UAV and to transfer impact energy incident upon the blunt head section into the hollow structural member to shatter the hollow structural member into fragments,
    wherein the recess is shaped to catch or block at least some of the fragments in an event the impact force shatters the hollow structural member.

2. The apparatus of claim 1, wherein the distal end of the wedge section has a smaller cross-sectional area than the base end of the wedge section.

3. The apparatus of claim 2, wherein the distal end of wedge section is blunt.

4. The apparatus of claim 1, wherein the blunt head section and the wedge section have oval or circular cross-sectional shapes.

5. The apparatus of claim 1, wherein the outer side of the blunt head section is convex.

6. The apparatus of claim 5, wherein the energy dispersion plug has a mushroom-like profile shape.

7. The apparatus of claim 1, wherein the energy dispersion plug further comprises:
    pressure focusing elements disposed along sides of the wedge section, the pressure focusing elements shaped to focus the impact energy for shattering the hollow structural member.

8. The apparatus of claim 7, wherein the pressure focusing elements comprise a carbide insert disposed in or on a side of the wedge section.

9. The apparatus of claim 1, wherein the blunt head section or the wedge section of the energy dispersion plug is fabricated of glass filled nylon.

10. The apparatus of claim 1, further comprising:
    the hollow structural member, wherein first and second instances of the energy absorbing plug are disposed in first and second open ends of the hollow structural member,
    wherein the hollow structural member comprises a wing spar for the UAV or a boom carrier that supports propulsion units for the UAV.

11. The apparatus of claim 10, wherein end sections of the hollow structural member in which the first and second instances of the energy absorbing plug are disposed are structurally weakened relative to a middle section of the hollow structural member.

12. An unmanned aerial vehicle (UAV) comprising:
    a wing assembly to provide lift;
    a plurality of boom assemblies that secure to the wing assembly, each of the boom assemblies including a plurality of rotors mounted to a boom carrier to provide vertical propulsion;
    a fuselage mounted to the wing assembly; and
    energy dispersion plugs inserted into ends of the boom carrier of each of the boom assemblies, each of the energy dispersion plugs including:
        a blunt head section having an outer side for receiving an impact force and an inner side opposite the outer side; and
        a wedge section having a base end and a distal end opposite the base end, wherein the wedge section extends at the base end from the inner side of the blunt head section towards the distal end and the distal end has a smaller cross-sectional area than the base end;
    wherein the wedge section is shaped to transfer impact energy incident upon the blunt head section into the boom carrier to shatter the boom carrier into fragments.

13. The UAV of claim 12, wherein each of the energy dispersion plugs further includes:
    a rim disposed around a perimeter of the inner side of the blunt head section forming a recess around the base end of the wedge section, wherein the recess is shaped to catch or block at least some of the fragments in an event the impact force shatters the boom carrier.

14. The UAV of claim 12, wherein the wing assembly includes a wing foil structurally supported by a wing spar that mounts to the fuselage and wherein additional instances of the energy dispersion plugs are inserted into ends of the wing spar.

15. The UAV of claim 12, wherein the energy dispersion plugs have a mushroom-like profile shape.

16. The UAV of claim 12, wherein each of the energy dispersion plugs further comprises:
   pressure focusing elements disposed along sides of the wedge section, the pressure focusing elements shaped to focus the impact energy for shattering the boom carrier.

17. The UAV of claim 16, wherein the pressure focusing elements comprise at least one of ribs, bumps, or carbide inserts disposed in or on the sides of the wedge section.

18. The UAV of claim 12, wherein end sections of the boom carrier in which the energy absorbing plugs are disposed are structurally weakened relative to a middle section of the boom carrier.

19. The UAV of claim 12, wherein the boom carrier comprises a hollow structural member.

20. An apparatus for use in an unmanned aerial vehicle (UAV), the apparatus comprising:
   an energy dispersion plug including:
      a blunt head section having an outer side for receiving an impact force and an inner side opposite the outer side;
      a wedge section having a base end and a distal end opposite the base end, wherein the wedge section extends at the base end from the inner side of the blunt head section towards the distal end; and
      a rim disposed around a perimeter of the inner side of the blunt head section forming a recess around the base end of the wedge section; and
   a hollow structural member of the UAV comprising a wing spar for the UAV or a boom carrier that supports one or more propulsion units for the UAV,
   wherein the energy absorbing plug is disposed in an open end of the hollow structural member,
   wherein the wedge section is shaped and sized to fit into the open end of the hollow structural member and to transfer impact energy incident upon the blunt head section into the hollow structural member to shatter the hollow structural member into fragments,
   wherein the recess is shaped to catch or block at least some of the fragments in an event the impact force shatters the hollow structural member.

21. An apparatus for use in an unmanned aerial vehicle (UAV), the apparatus comprising:
   an energy dispersion plug including:
      a blunt head section having an outer side for receiving an impact force and an inner side opposite the outer side;
      a wedge section having a base end and a distal end opposite the base end, wherein the wedge section extends at the base end from the inner side of the blunt head section towards the distal end;
      a rim disposed around a perimeter of the inner side of the blunt head section forming a recess around the base end of the wedge section; and
      a pressure focusing element disposed along a side of the wedge section, the pressure focusing element shaped to focus the impact energy for shattering a hollow structural member, wherein the pressure focusing element is fabricated of a different harder material than that of the wedge section,
   wherein the wedge section is shaped and sized to fit into an open end of the hollow structural member of the UAV and to transfer impact energy incident upon the blunt head section into the hollow structural member to shatter the hollow structural member into fragments.

* * * * *